United States Patent [19]
Vanderveen

[11] 3,993,739
[45] Nov. 23, 1976

[54] PROCESS FOR PRODUCING CARBON BLACK PELLETS

[75] Inventor: John W. Vanderveen, Bartlesville, Okla.

[73] Assignee: Phillips Petroleum Company, Bartlesville, Okla.

[22] Filed: Jan. 23, 1975

[21] Appl. No.: 543,499

[52] U.S. Cl. ............................ 423/460; 34/4; 34/39; 264/117; 23/314; 106/307
[51] Int. Cl.² .................................... C09C 1/48
[58] Field of Search ............... 106/307; 34/4, 39; 264/117; 423/460; 23/314

[56] References Cited
UNITED STATES PATENTS

| | | | |
|---|---|---|---|
| 3,251,137 | 5/1966 | Alleman | 34/39 |
| 3,255,041 | 6/1966 | Culp et al. | 34/4 |
| 3,481,754 | 12/1969 | Lewis et al. | 106/307 |
| 3,870,785 | 3/1975 | Hendersen | 106/307 |

*Primary Examiner*—Patrick P. Garvin
*Assistant Examiner*—J. V. Howard

[57] ABSTRACT

A process for pelleting carbon black is disclosed wherein flocculent carbon black is pelleted in the conventional manner by mixing the carbon black with an aqueous pelleting liquid and stirring the mixture to form water-containing carbon black pellets. These water-containing carbon black pellets are then predried conventionally in order to remove a first major portion of the aqueous pelleting solution therefrom. For the removal of a remaining minor second portion of said aqueous solution, the carbon black pellets are subjected to a microwave irradiation.

5 Claims, 2 Drawing Figures

PROCESS FOR PRODUCING CARBON BLACK PELLETS

This invention relates to the art of forming carbon black pellets.

More specifically, the invention improves the drying step of a process for the production of carbon black pellets prepared with aqueous pelleting solutions.

BACKGROUND OF THE INVENTION

Carbon black is for most of its applications used in a pellet form in order to avoid the problem of dust production either in the initial packaging operations or on ultimate use. A conventional way of forming pellets is to mix the flocculent carbon black with an aqueous pelleting solution and stirring the mixture to form wet carbon black pellets which are then dried. The drying step creates, however, considerable problems. Dryers for pellets are very expensive and bulky and the drying step itself is usually a relatively time-consuming operation.

THE INVENTION

It is, therefore, one object of this invention to provide a new carbon black pelleting process.

A further object of this invention consists in providing such a carbon black pelleting process with an improved drying step.

Furthermore, it is an object of this invention to provide for a process for drying carbon black pellets containing some aqueous pelleting solution or agent which is both extremely fast and efficient.

Figure 1:
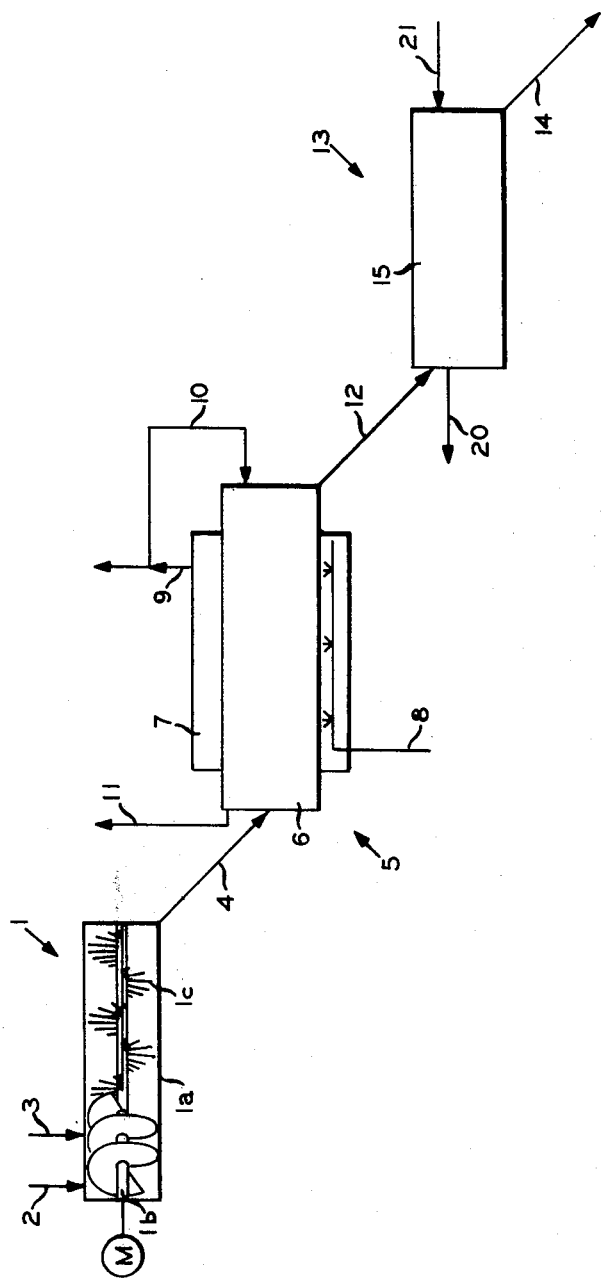
Figure 2:
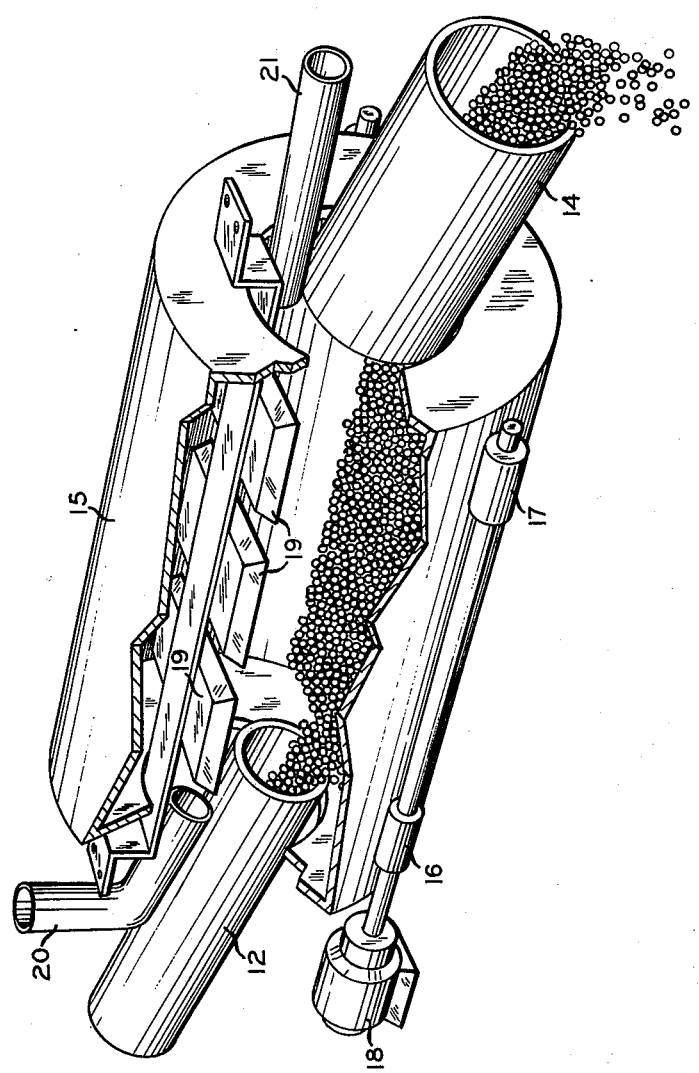

Further objects, aspects, advantages and embodiments of this invention will become apparent to those skilled in the art from the following detailed description of the invention, the appended claims and the drawing, wherein FIG. 1 schematically shows an apparatus to carry out this invention and FIG. 2 shows some details of the microwave heating unit.

In accordance with this invention, I have discovered that complete drying of wet pellets can be readily achieved without adverse effect on the pellet structure by subjecting the wet pellet to a microwave irradiation. This microwave irradiation causes the water of the pelleting solution inside of the pellets to get very hot and thus very rapidly dries the pellets to a very low water content. Surprisingly, the pellets are not destroyed by this drying method although the removal of the water takes place within a fraction of the time required to effect the respective drying by conventional means.

The pelleting process of this invention is applicable to any kind of pelletizable materials that can be pelleted with a water-containing agent and will neither be destroyed by the microwaves nor by the heat created by these microwaves. Examples of such pelletizable materials are carbon blacks, naturally occurring zeolite ores, porous sodium fluoride, sodium metasilicate, and calcium metaphosphate, with carbon black being the presently preferred pelletizable solid.

In accordance with a preferred embodiment of this invention, wet carbon black pellets coming from the pelleting mill are predried conventionally, e.g., by passing the pellets through a heated drum, to remove a major portion of the water, and only the final drying step is carried out by the microwave irradiation. Preferably, the carbon black pellets are predried conventionally to contain about 5 to about 15 weight percent of water. This remaining water is then removed during the final microwave irradiation heating step to produce carbon black pellets which are essentially waterfree. The major portion of the water of the pelleting agent is removed in a first drying stage by conventional means such as passing the wet pellets through a heated rotating drum.

In another embodiment the aqueous pelleting solution or agent can contain various agents such as molasses or antioxidants. The latter are incorporated for future use in a rubber compositon as antioxidants for the rubber. In accordance with another embodiment of this invention, it is presently preferred to incorporate in the pelleting solution nitric acid, $HNO_3$, which acts to partially oxidize the carbon black during the drying stage. This oxidation takes place during the final heating stage when the temperature reaches a sufficiently high value. The two-step drying process mentioned above is of particular advantage when nitric acid is used for said partial oxidizing purpose. Substantial amounts of nitrogen oxides are only released during the microwave heating step; thus, the recovery of these oxides is more readily achieved than if they would be removed together with the large quantity of water in a one-step heating process.

The microwaves which can be utilized for the drying purposes of this invention, generally speaking, are all the electromagnetic microwaves created with electronic circuitry that will sufficiently heat the carbon black pellets. These waves usually are within a frequency range of about 0.8 to about 100 gigahertz. The main limitation for the microwaves is given by the law; only microwaves are to be used the frequency range of which is allowed for industrial applications. Thus, presently the microwaves of about 2400 MHz are preferred.

In FIG. 1, an apparatus for carrying out the process of this invention is schematically shown. Into pelleter 1 flocculent carbon black is introduced via line 2. An aqueous solution which may contain $HNO_3$ is introduced through line 3. The pelleter 1 comprises a cylinder 1a and rotatively arranged therein a shaft 1b with radial rods 1c. The shaft is rotated by a motor. The carbon black and the aqueous pelleting solution are thoroughly mixed by the rotation of the rods. Thereby wet carbon black pellets are formed.

These wet carbon black pellets as produced are fed via line 4 into a first dryer 5. This dryer consists essentially of a cylinder 6 which is rotated around its essentially horizontal axis. The cylinder 6 is heated by hot combustion gases passed through a jacket 7 surrounding said cylinder. These heating gases are introduced into the jacket 7 via line 8 and removed therefrom via line 9. A portion of the heating gases is introduced into the heating drum 6 via line 10 into direct contact with the carbon black pellets. This portion of the heating gases sweeps away the water vapor and the gas mixture is removed via line 11 from the heating cylinder 6.

The thus partially dried pellets still contain a minor quantity of water inside of the pellets. In order to remove this water, the partially dried pellets are fed via line 12 into a microwave irradiation unit 13. Therein the water in the pellets is rapidly removed by heating by the microwaves which reach the water inside of the carbon black pellet directly, rather than by the thermal conduction of conventional drying. The dried pellets are then removed via line 14 and recovered. Nitrogen oxides, if present, are removed via line 20.

Some details of the microwave heater are shown in FIG. 2. Feed line 12 reaches into the interior of a cylindrically shaped housing 15. This housing is arranged on two sets of rollers 16, 17 (only one is shown in FIG. 2) which can be driven by a motor 18, thus rotating the housing 15 around its axis. Inside of the approximately horizontally arranged housing 15 one or more microwave emitters 19, such as Klystron tubes, are arranged. The dried carbon black pellets are withdrawn at the end opposite to the inlet 12 from the housing via line 14.

The invention will be more fully understood from the following specific examples.

Example I 100 g. Wet carbon black pellets containing 50 weight percent of water were put into a household microwave oven (Amana). The efficiency of the oven was such that about 25–100 W were delivered as microwave radiation. During the microwave irradiation steam came off the pellets. After two minutes of drying the pellets were removed from the oven. No pellets were broken or had exploded. The water content of the pellets was less than 1 weight percent.

From the results obtained in this example the following commercial scale example was calculated.

Example II

4000 Pounds per hour wet carbon black pellets are made by thoroughly mixing 2000 pounds per hour of flocculent carbon black and 2000 pounds per hour of water containing 5 weight percent of $HNO_3$ in a conventional rotating pin-type wet pelleter. These pellets consist essentially of 50 parts by weight of water and 50 parts by weight of carbon black. These wet carbon black pellets are then heated in a rotary dryer for about 7 minutes until they weigh about 2200 pounds. The pellets at that stage contain about 9 weight percent of water. To finally dry these pellets to a water content of less than about 1 weight percent in a conventionally employed rotary dryer would take additionally about 23 minutes. In accordance with this invention, the partially dried carbon black pellets (containing about 9 weight percent of water) are now subjected to a microwave irradiation in a microwave heater emitting microwaves of 2450 MHz or about 12 cm waves. The pellets are dried to contain less than about 1 weight percent of water within about 2 minutes. Whereas the final drying step to dry pellets from about 9 weight percent of water to less than about 1 weight percent of water takes about 75 percent of the overall drying time in standard drying apparatus, this step in accordance with the invention requires only about 25 percent of the overall drying time; that is, the conventional drying requires a total of about 30 minutes while the system of the invention requires only about 9 to 10 minutes total time. This means the original dryer size can be cut to about one-fourth for the system of the invention.

Reasonable variations and modifications, which will be apparent to those skilled in the art, can be made in this invention without departing from the spirit and scope thereof.

I claim:

1. A process for the production of dried carbon black pellets which comprises
   a. admixing carbon black and an aqueous pelleting solution such as to form wet carbon black pellets,
   b. subjecting said wet carbon black pellets to thermal drying to remove a major portion of the water therefrom such as to produce partially dried carbon black pellets still containing a minor portion of water,
   c. subjecting said partially dried pellets to a microwave irradiation such as to remove the minor portion of water and to produce dried carbon black pellets.

2. A process according to claim 1 wherein the wet carbon black pellets are predried to remove from 85 to 95 percent of the water therefrom.

3. A process in accordance with claim 1 wherein the carbon black pellets are subjected to said microwave irradiation until they contain less than about 1 weight percent of water.

4. A process in accordance with claim 1 wherein microwaves of about 12 cm wave length are used.

5. A process in accordance with claim 1 wherein said aqueous pelleting solution comprises $HNO_3$ in a quantity sufficient to effect a desired oxidation of the carbon black.

* * * * *